May 30, 1933.  R. DEFIVES  1,912,261
FLUID OPERATED RELAY BRAKE
Original Filed April 19, 1929
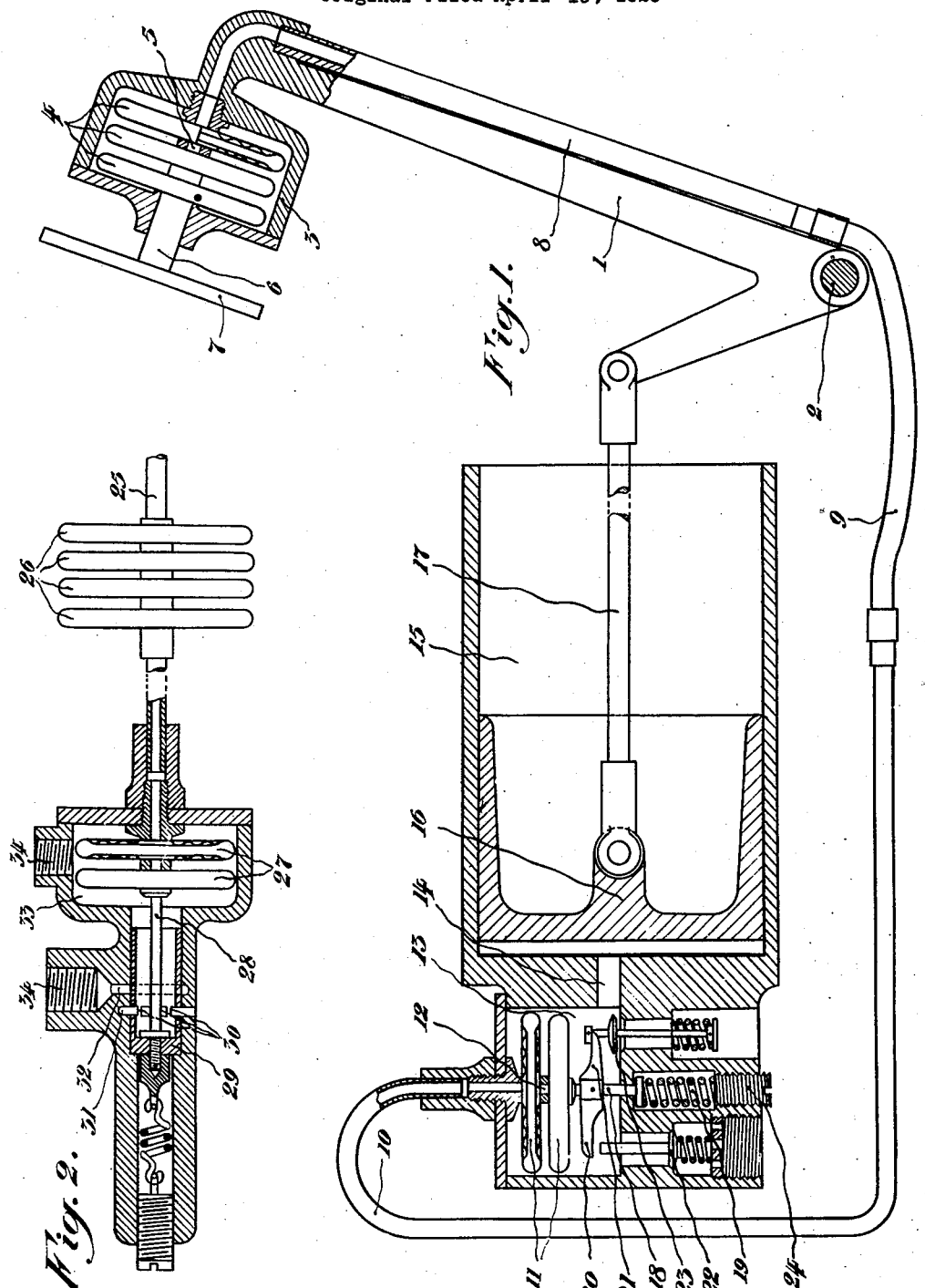

Patented May 30, 1933

1,912,261

UNITED STATES PATENT OFFICE

RAYMOND DEFIVES, OF LIEGE, BELGIUM, ASSIGNOR TO SERVO-FREIN DEWANDRE, SOCIÉTÉ ANONYME, OF LIEGE, BELGIUM

FLUID OPERATED RELAY BRAKE

Application filed April 19, 1929, Serial No. 356,548, and in France April 21, 1928. Renewed April 8, 1933.

The present invention relates to a relay brake, that is to say a servo-motor operating through the mechanical control of the driver to assist in operating the brakes.

In order that the assistance provided by the relay brake will be gradual and proportional to the muscular effort exerted upon the pedal, it is necessary to be able to regulate perfectly the operating pressure differences of the servo-motor to the same degree as the muscular effort exerted by the driver on the pedal.

It is also important that the driver have complete mechanical control over the brake in the event of the failure of the relay brake.

The present invention will now be described with reference to the accompanying drawing which illustrates two forms of construction of the invention.

Figure 1 shows, in elevation with part in section, a relay brake constructed according to the invention, air under pressure employed as a source of energy.

Figure 2 shows a modification of the main members of the relay brake where the energy employed is a source of vacuum.

A pedal lever 1, mounted upon a shaft 2 and controlling the brakes (Fig. 1), is fitted with or formed to provide a casing 3 which houses deformable chambers 4 communicating with each other through an orifice 5, thus forming a chamber of variable volume or capacity.

These chambers 4 are rigid at one end with the pedal lever 1 and connected at the other end with a push rod 6, rigid with a plate 7. The chambers are thus connected between the plate 7 and the brake rodding.

These chambers 4 communicate through a tube 8, flexible tube 9 and a tube 10 with the interior of similar chambers 11. Chambers 11 communicate with each other through an orifice 12 and are arranged within a casing 13, which communicates through an orifice 4 with a power cylinder 15.

The chambers 11 may be caused to expand or contract by varying their relative internal or external pressure.

The chambers 11 are connected to a rod 18, movement of which in one direction is resisted by a spring 19 which tends to hold chambers 11 normally contracted.

The rod 18 carries two levers 20 and 21. The lever 20 controls a fluid pressure admission valve 22 and the lever 21 controls an exhaust valve 23.

When in normal relation, the spring 19 acting through the rod 18, holds the chambers 11 contracted in which position the lever 21 holds the exhaust valve 23 open while the admission valve 22 remains closed.

The operation is as follows:—

When the driver exerts pressure upon the plate 7 and advances the pedal lever 1 in a direction to mechanically apply the brakes, the push rod 6 is moved into the casing 3 and compresses the deformable chambers 4 which, as a result of their reduction in volume, produce an internal pressure which varies with variation in the pressure on the pedal 1.

The pressure thus obtained in the chambers 4, is transmitted through the tubes 8, the flexible tubes 9 and the tube 10 to the interior of the chambers 11 and acts to expand them against the resistance of the spring 19, the tension of which is adjustable through a screw 24. This adjustment obviously provides for the intervention of the relay brake at any predetermined intensity of mechanical braking obtained by the mechanical pressure of the driver.

Thus a braking action of small intensity may be obtained by a muscular effort only, where the adjustment of the spring 19 is such as to prevent the expansion of the chambers 11, which latter determine the cooperation of the pneumatic relay brake.

If the pressure on the pedal increases so as to overcome the resistance of the spring 19, by an increase in pressure in the chambers 4 and in the chambers 11, the latter will expand and move the rod 18, and through the corresponding movement of the arm or lever 21 close the exhaust valve 23 the corresponding movement of the lever 20 opening the admission valve 22. The latter valve, when open, permits air under pressure to enter the casing 13 and the cylinder 18 and actuate the piston 16 to assist the driver in moving forward the pedal lever, the shaft or pivot 2 of which operates the brakes.

When under the operation described the braking action developed is sufficient for the particular purpose, further mechanical pressure on the pedal is interrupted. The pressure existing in the cylinder 15 and the casing 13 is directed against the exterior of the chambers 11, compelling them to contract and correspondingly move, with the effect to move the rod 18 and so operate the lever 20 as to permit the admission valve 22 to close. This movement of the rod 18 is, however, insufficient to cause such movement of the lever 21 as to open the exhaust valve 23. It is quite apparent that in this operation the exhaust valve 23 must not be permitted to open, for such opening of the exhaust valve would produce a reduction in pressure in the cylinder 15 and on the outer faces of the chambers 11; while the pressure on their inner faces, remaining the same, would cause them to expand and the resultant movement of the rod 18 and the lever 20 would open the admission valve 22 and allow compressed air to enter the cylinder.

It is thus apparent that the pressure existing in the power cylinder of the relay brake is always equal to the pressure produced in the chambers 11 by the effort exerted by the driver on the pedal. In fact, the chambers 11 are in equilibrium between these two opposed pressures. Consequently, if one or the other of these pressures is reduced or increased, one or the other of the valves 22 and 23 will intervene in order to reestablish this equilibrium.

If the effort exerted upon the pedal is increased the pressure in the chambers 4 and on the inner face of the chambers 11 increases, thus opening again the valve 22 and an increased pressure is established in the cylinder 15 and on the face of the piston 16.

If on the contrary, the effort exerted upon the pedal is reduced, the pressure in the chambers 4 and upon the inner face of the chambers 11 falls, without, however, affecting the then pressure upon the exterior faces of the chambers. In this operation the difference between the external and the internal pressure on the chambers 11 causes a further contraction of the chambers and a correspondingly further movement of the rod 18, with the effect to open the exhaust valve 23 and permit the pressure within the casing 13 and cylinder 15 to exhaust to a degree to equalize the internal and external pressures on the chambers 11.

In order to prevent too large a deformation of the chambers and to reduce the number of deformable chambers 4, a certain initial pressure may be established in the interior of these chambers 4 and 11 the operating effect of which will be balanced by adjusting the tension of the spring 19 to a degree to prevent the chambers 11 from expanding under their normal interior pressure. When at rest, the internal pressure in the chambers 4 and 11 is thus compensated by the tension of the spring 19 and it is only the additional pressure produced by the driver's mechanical effort which will act upon the valves 22 and 23. As an initial pressure already exists in the chambers 4 it may be increased in order to raise it to the desired degree, by a slight inward movement of the rod 6 and a comparatively slight deformation of the chambers 4.

Figure 2 illustrates a modification wherein, through constructional changes, the invention is adapted to utilize a source of vacuum or suction as the controlling power agent. In this form there is shown a series of deformable chambers 26 having pipe communication with deformable chambers 27, the chambers 26 being subjected to mechanical expansion by pull on a rod 25. The chambers 27 are connected by a rod 28 to a slide valve 29, the movement of the rod being resisted in one direction by a spring, the tension of which is designed for adjustment, as indicated. The deformable chambers 27 are housed in a casing 33, corresponding to the casing 13 of the first form, and having an outlet 34 which communicates with the cylinder 15, it being understood that the cylinder 15, piston 16, and cooperating parts are similar to those shown in Figure 1. The casing 33 is extended in reduced diameter and formed with a port 32 which communicates with an interiorly threaded boss providing an inlet 34' for connection with a source of vacuum or suction, the reduced portion of the casing 33 being also provided with an atmospheric port or vent 31. The valve 29 is of hollow form opening toward the deformable chambers 27, that is the valve 29 is interiorly in open communication with the port 34 leading to the cylinder 15. The slide valve 29 is formed with a series of openings 30 which, in the normal position of the parts, register with the atmospheric port 31 to thus establish a state of equilibrium of the piston 16 under atmospheric pressure on each side.

If a pull is produced upon the rod 25, the chambers 26 will expand and a partial vacuum is produced in the interior of the latter which will have the effect of contracting the chambers 27, and through the rod 28 correspondingly moving the slide valve 29. The ports 30 in the slide valve 29, which are normally opposite the atmospheric ports 31, are moved to register with the ports 32 in order to put the source of partial vacuum, connected at 34' into communication with the casing 33 performing the same function as the casing 13 shown in Fig. 1, which box 33 is in communication through the passage 34 with a partial vacuum power cylinder, not shown, but which is analogous to the cylinder 15 shown in Figure 1.

When the effort exerted upon the rod 25 ceases, the partial vacuum existing in the cylinder and in the casing 33 causes the chambers 27 to expand, with the effect to move the valve 29 so that the ports 30 are out of registry with the ports 31 and 32. At this moment, the chambers 27 are in equilibrium between the partial vacuum existing on their inner faces and the partial vacuum existing on their outer faces so that a reduction or increase in the partial vacuum inside these chambers will bring the ports 30 opposite the port 31 or 32.

The operation is, therefore, in ultimate effect the same as that of the apparatus shown in Figure 1.

What I claim is:

1. A vehicle brake control including a pressure actuated brake operating means, valves for controlling the operating pressure of said means, a chamber open to the pressure of the brake operating means, a hollow expansible and compressible member in and subject to the pressure in said chamber, manually operable means for creating an interior pressure in said hollow member, and means between the member and valves to selectively operate the valves in accordance with the variation of external and internal pressure on said member.

2. A vehicle brake control including a pressure actuated brake operating means, inlet and exhaust valves for controlling the admission and exhaust of the pressure relative to said means, a chamber open to the pressure of said means, a hollow member arranged in said chamber and responsive to internal and external pressure, said hollow member being at all times open exteriorly to the pressure in said chamber, manually operable means for creating selective internal pressure in the hollow member, and connections controlled by the member for opening the inlet valve under relatively increased internal pressure in the hollow member and opening the exhaust valve under relatively increased external pressure on the hollow member.

3. A vehicle brake control including a pressure actuated brake operating means, inlet and exhaust valves for controlling the admission and exhaust of the pressure relative to said means, a chamber open to the pressure of said means, a hollow member in said chamber and exteriorly subjected to the pressure on said means, manually operable means for selectively creating an internal pressure in said hollow member, said manually operable means providing for increasing, decreasing or equalizing the internal pressure in said hollow member with respect to the external pressure thereon, and means operated by said hollow member to open the inlet valve and close the exhaust valve under predetermined relatively increased internal pressure in the hollow member and to open the exhaust valve and close the inlet valve under predetermined relatively increased external pressure in the hollow member.

4. A vehicle brake control including a pressure actuated brake operating means, inlet and exhaust valves for controlling the admission and exhaust of the pressure relative to said means, a chamber open to the pressure on said means, a hollow member in said chamber and exteriorly subjected to the pressure on said means, manually operable means for selectively creating an internal pressure in said hollow member, said manually operable means providing for increasing, decreasing or equalizing the internal pressure of the hollow member with respect to the external pressure, and means operated by the hollow member to open the inlet valve and close the exhaust valve under predetermined relatively increased internal pressure in the hollow member and to open the exhaust valve and close the inlet valve under relatively increased external pressure on the hollow member, said hollow member when in pressure equilibrium being without operating effect on either valve.

5. A vehicle brake control including a pressure actuated brake operating means, inlet and exhaust valves for controlling the operating pressure of said means, a chamber open to the pressure on said means, a hollow member in said chamber at all times exteriorly subjected to the pressure on said means, manually operable means for creating a selective internal pressure in said hollow member, said manually operable means serving to actuate the hollow member by increasing or decreasing the internal pressure thereof relative to the external pressure thereof, a rod operated in the movement of the member, and means carried by the rod to oppositely actuate the inlet and exhaust valves in any movement of the hollow member.

6. A vehicle brake control including a pressure actuated brake operating means, inlet and exhaust valves for controlling the pressure on said means, a chamber open to such pressure, a hollow member in said chamber and exteriorly subjected at all times to the operating pressure of said means, manually operable means for creating selective interior pressure in said hollow member, said manually operable means serving to actuate the hollow member by increasing or decreasing its internal pressure relative to its external pressure, a rod operated in the movement of the hollow member, and means carried by the rod to oppositely actuate the inlet and exhaust valves, said manually operable means providing for a balanced condition of the hollow member through creating an internal pressure to balance the external pressure on the hollow member, said hollow member in balanced condition being without operating effect on either valve.

7. A vehicle brake control including a pressure actuated brake operating means, a normally closed pressure inlet valve therefor, a normally open exhaust valve therefor, a chamber open to the pressure on said means, a hollow expansible and contractible member in said chamber and exteriorly subjected to the pressure in said chamber, manually operable means for varying the internal pressure in the hollow member to thereby vary its position, means intermediate the member and inlet valve to open the valve under a predetermined change in position of said hollow member incident to an increase in internal pressure, said hollow member being exteriorly subjected to the pressure incident to the opening of the inlet valve, said hollow member when subjected to an exterior pressure greater than the interior pressure in said hollow member moving the hollow member in a direction to free the inlet valve from the valve-opening effect of said hollow member.

8. A vehicle brake control including a pressure actuated brake operating means, a normally closed pressure inlet valve therefor, a normally open exhaust valve therefor, a chamber open to the pressure on said means, a hollow expansible and contractible member arranged in said chamber, manually operable means for creating a selected internal pressure in the hollow member to thereby vary its position, and means intermediate the hollow member and inlet valve to open the valve under a predetermined change in position of said hollow member incident to an increase in its internal pressure, said hollow member being exteriorly subjected to the pressure incident to the opening of the inlet valve to thereby counteract external pressure on the hollow member, said hollow member under an external pressure balancing the internal pressure moving to a position to permit the inlet valve to fully close.

9. A vehicle brake control including a pressure actuated brake operating means, a normally closed pressure inlet valve therefor, a normally open exhaust valve therefor, a chamber open to the pressure on said means, a hollow expansible and contractible member arranged in said chamber, manually operable means for creating a selected internal pressure in the hollow member to thereby vary its position, means intermediate the member and inlet and exhaust valves to open the inlet valve and permit the exhaust to close under a predetermined change in position of said hollow member incident to an increase in internal pressure, said hollow member being interiorly subjected to the pressure incident to the opening of the inlet valve to thereby counteract the internal pressure on the hollow member, said hollow member under an external pressure balancing the internal pressure moving to a position to permit the inlet valve to fully close, said member under an external pressure in excess of the internal pressure moving to a position to permit the inlet valve to close and to open the exhaust valve.

In witness whereof I affix my signature.

RAYMOND DEFIVES.